(12) United States Patent
Liu et al.

(10) Patent No.: US 10,841,530 B2
(45) Date of Patent: Nov. 17, 2020

(54) METHOD, DEVICE, AND MOBILE TERMINAL FOR CONVERTING VIDEO PLAYING MODE

(71) Applicant: ALIBABA GROUP HOLDING LIMITED, Grand Cayman (KY)

(72) Inventors: Xin Liu, Hangzhou (CN); Zhechang Yu, Hangzhou (CN); Tong Mo, Hangzhou (CN)

( * ) Notice: Subject to any disclaimer, the term of this patent is extended or adjusted under 35 U.S.C. 154(b) by 0 days.

(21) Appl. No.: 16/441,986

(22) Filed: Jun. 14, 2019

(65) Prior Publication Data
US 2019/0297300 A1    Sep. 26, 2019

Related U.S. Application Data

(63) Continuation of application No. PCT/CN2017/114542, filed on Dec. 5, 2017.

(30) Foreign Application Priority Data

Dec. 15, 2016 (CN) .......................... 2016 1 1158785

(51) Int. Cl.
| | | |
|---|---|---|
| *H04N 7/01* | (2006.01) | |
| *H04N 13/139* | (2018.01) | |
| *H04N 13/359* | (2018.01) | |
| *H04N 21/4782* | (2011.01) | |
| *H04N 21/431* | (2011.01) | |

(52) U.S. Cl.
CPC ........... *H04N 7/013* (2013.01); *H04N 7/0115* (2013.01); *H04N 13/139* (2018.05); *H04N 13/359* (2018.05); *H04N 21/431* (2013.01); *H04N 21/4782* (2013.01)

(58) Field of Classification Search
CPC .......................... H04N 13/359; H04N 13/139
See application file for complete search history.

(56) References Cited

U.S. PATENT DOCUMENTS

| | | | |
|---|---|---|---|
| 9,036,083 B1* | 5/2015 | Zhu | .................... H04N 21/4788 348/465 |
| 2001/0019337 A1 | 9/2001 | Kim | |
| 2004/0125143 A1 | 7/2004 | Deaton et al. | |

(Continued)

FOREIGN PATENT DOCUMENTS

| | | |
|---|---|---|
| CN | 201967061 U | 9/2011 |
| CN | 102521862 A | 6/2012 |

(Continued)

OTHER PUBLICATIONS

Second Office Action for Chinese Application No. 201611158785.0 dated Dec. 2, 2019 (5 pages).

(Continued)

*Primary Examiner* — Paulos M Natnael (57) ABSTRACT

Methods, systems, and devices, including computer programs encoded on computer storage media, for converting video playing mode are provided. One of the methods includes: detecting video content for playing in a browser page; inserting a conversion button in the browser page for converting the playing mode of the video content; and in response to an operation performed by a user on the conversion button, converting the playing mode of the video content between a normal video playing mode and a VR video playing mode.

14 Claims, 5 Drawing Sheets

(56) References Cited

U.S. PATENT DOCUMENTS

| | | | |
|---|---|---|---|
| 2005/0086612 A1 | 4/2005 | Gettman et al. | |
| 2011/0285821 A1* | 11/2011 | Ogawa | H04N 21/440236 348/46 |
| 2013/0024764 A1 | 1/2013 | Lou et al. | |
| 2015/0123966 A1* | 5/2015 | Newman | G06T 19/006 345/419 |
| 2015/0170397 A1 | 6/2015 | Han et al. | |
| 2016/0063919 A1* | 3/2016 | Ha | G02B 27/017 345/156 |
| 2016/0084647 A1* | 3/2016 | Lee | G01B 21/00 73/1.79 |
| 2018/0160194 A1* | 6/2018 | Bayliss | H04N 21/47217 |
| 2019/0297300 A1* | 9/2019 | Liu | H04N 13/344 |

FOREIGN PATENT DOCUMENTS

| | | |
|---|---|---|
| CN | 102822872 A | 12/2012 |
| CN | 102937968 A | 2/2013 |
| CN | 103338384 A | 10/2013 |
| CN | 105611280 A | 5/2016 |
| CN | 105898337 A | 8/2016 |
| CN | 205485921 U | 8/2016 |
| CN | 105930120 A | 9/2016 |
| CN | 205562965 U | 9/2016 |
| CN | 106101503 A | 11/2016 |
| CN | 104350487 B | 3/2017 |
| CN | 104837005 B | 6/2017 |
| JP | 5268991 B2 | 8/2013 |
| KR | 101028342 B1 | 4/2011 |
| WO | 2016051366 A2 | 4/2016 |

OTHER PUBLICATIONS

Written Opinion of the International Searching Authority and International Search Report for PCT Application No. PCT/CN2017/114542 dated Jan. 31, 2018 (12 pages).

International Preliminary Report on Patentability Chapter I for PCT Application No. PCT/CN2017/114542 dated Jun. 27, 2019 (10 pages).

First Search for Chinese Application No. 201611158785.0 dated May 22, 2019 (1 page).

First Office Action for Chinese Application No. 201611158785.0 dated Jul. 2, 2019 (4 pages).

* cited by examiner

METHOD, DEVICE, AND MOBILE TERMINAL FOR CONVERTING VIDEO PLAYING MODE

CROSS-REFERENCE TO RELATED APPLICATIONS

The present application is a continuation application of International Application No. PCT/CN2017/114542, filed on Dec. 5, 2017, which is based on and claims priority to the Chinese Patent Application No. 201611158785.0 filed with the State Intellectual Property Office (SIPO) of the People's Republic China on Dec. 15, 2016. The entire contents of the above-identified applications are incorporated by reference herein.

TECHNICAL FIELD

The present specification relates to the field of browser technologies, and in particular, to a method, device, and a mobile terminal for converting video playing mode.

BACKGROUND

With the rapid development of virtual reality (VR) technologies, a user may use a mobile terminal, together with a pair of VR glasses, to watch VR videos. According to the current technologies, to watch a VR video, a user may need to either search for specialized VR video sources or use specialized player software to convert a regular video to a VR video. However, most video websites do not provide specialized VR video sources at present, and online videos on a website cannot be played through player software, causing users unable to watch video contents on the website in VR mode.

SUMMARY

To overcome the above-described deficiencies in the current technologies, methods, systems, and devices, including computer programs encoded on computer storage media, for converting video playing mode are provided.

In one aspect, this specification provides a method for converting video playing mode. The method may include: detecting a video content for playing in a browser page; inserting a conversion button in the browser page for converting the playing mode of the video content; and in response to an operation performed by a user on the conversion button, converting the playing mode of the video content between a normal video playing mode and a VR video playing mode.

In some embodiments, the VR video playing mode is for viewing with VR glasses. The step of converting playing mode of the video content from the normal video playing mode to the VR video playing mode may include: changing a playing window in the normal video playing mode to two horizontally side-by-side playing windows for displaying the video content synchronously, so that the playing mode of the video content can be converted from a normal video playing mode to a VR video playing mode.

In another aspect, this specification provides a device for converting video playing mode, and the device may include: a video content detecting module configured to detect a video content for playing in a browser page; a conversion button inserting module configured to insert a conversion button in the browser page for converting the playing mode of the video content; and a converting module configured to convert, in response to an operation performed by a user on the conversion button, the playing mode of the video content between a normal video playing mode and a VR video playing mode.

In some embodiments, the VR video playing mode is for viewing with VR glasses. The manner in which the converting module converts a playing mode of the video content from the normal video playing mode to the VR video playing mode may include: changing a playing window in the normal video playing mode to two horizontally side-by-side playing windows for displaying the video content synchronously, so that the playing mode of the video content can be converted from a normal video playing mode to a VR video playing mode.

In yet another aspect, this specification provides a non-transitory computer-readable storage medium for converting video playing mode. The non-transitory computer-readable storage medium may store instructions executable by one or more processors to cause the one or more processors to perform operations. The operations may include: detecting a video content for playing in a browser page; inserting a conversion button in the browser page for converting the playing mode of the video content; and in response to an operation performed by a user on the conversion button, converting the playing mode of the video content between a normal video playing mode and a VR video playing mode.

In still another aspect, this specification provides a device for converting video playing mode. The device may include: one or more processors and one or more non-transitory computer-readable memories. The memories may be coupled to the one or more processors and configured with instructions executable by the one or more processors to cause the system to perform operations. The operations may include: detecting a video content for playing in a browser page; inserting a conversion button in the browser page for converting the playing mode of the video content; and in response to an operation performed by a user on the conversion button, converting the playing mode of the video content between a normal video playing mode and a VR video playing mode.

In some embodiments, converting the playing mode of the video content between a normal video playing mode and a VR video playing mode may include: changing a playing window in the normal video playing mode to two horizontally side-by-side playing windows for displaying the video content synchronously, so that the playing mode of the video content can be converted from a normal video playing mode to a VR video playing mode.

The present specification provides a method, a non-transitory computer-readable storage medium, a device, and a mobile terminal for converting video playing mode, according to which users are enabled to watch video contents on websites in VR mode. In some embodiments, video contents rendered in a browser page are monitored, and a conversion button is inserted in the page when a video is provided from the page. When an operation performed by a user on the conversion button is detected, the playing mode of the video's content is converted between a normal video playing mode and a VR video playing mode.

BRIEF DESCRIPTION OF THE DRAWINGS

To more clearly describe the technical solutions of embodiments of the present specification, the accompanying drawings to be used in the embodiments will be briefly described. The accompanying drawings merely illustrate some embodiments of the present specification, and therefore, should not be deemed as a limitation to the scope. One of ordinary skill in the art may obtain other related drawings according to the accompanying drawings without creative effort.

Numerals: 100—mobile terminal; 110—device for converting video playing mode; 111—video content detecting module; 112—conversion button inserting module; 113—converting module; 1131—video label inserting sub-module; 1132—video window adjusting sub-module; 114—video playing module; 120—memory; 130—processor; 140—display unit.

DETAILED DESCRIPTION

To make the objectives, technical solutions, and advantages of embodiments of the present specification clearer, the technical solutions in the embodiments of the present specification will be described below with reference to the accompanying drawings. The described embodiments are merely some, but not all, embodiments of the present specification. Components in the embodiments of the present specification described and illustrated in the accompanying drawings may be arranged in various configurations.

The detailed description of the embodiments of the present specification provided in the accompanying drawings is not intended to limit the protection scope of the present specification, but merely to illustrate selected embodiments of the present specification. Based on the embodiments of the present specification, all other embodiments obtainable to one of ordinary skill in the art without creative efforts shall fall within the protection scope of the present specification.

Similar numerals and letters represent similar items in the accompanying drawings below. Therefore, for an item defined in one figure, there is no need to further define or explain the item in subsequent figures.

In the description of the present specification, terms such as "first," "second," and "third" are used for differentiation in the description, and may not be construed as indicating or implying relative importance.

In the description of the present specification, terms such as "setting," "installing," "connecting," and "linking" should be understood in their broad meanings, unless otherwise specifically limited. For example, "connecting" may refer to a fixed connection, a removable connection, or an integral connection; may be a mechanical connection or an electrical connection; may be a direct connection, an indirect connection via an intermediate medium, or an internal communication between two elements. The specific meaning of the above terms may be understood by one of ordinary skill in the art according to specific situations.

Figure 1:
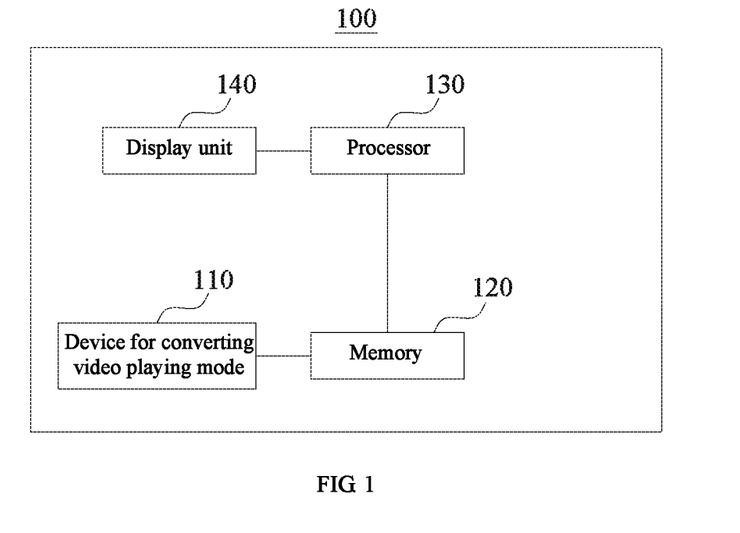
FIG. 1 is a schematic diagram of the mobile terminal according to some embodiments of the present specification.

FIG. 1 is a schematic diagram of the mobile terminal 100 according to some embodiments of the present specification. The mobile terminal 100 may include, but is not limited to, a smart phone, a personal computer (PC), a tablet computer, a personal digital assistant (PDA), a mobile Internet device (MID), etc. The operating system of the terminal 100 may include, but is not limited to, Android, IOS (iPhone operating system), Windows phone system, Windows system, etc. The mobile terminal 100 is installed with a browser APP for browsing video contents through a web page. The mobile terminal 100 comprises a device for converting video playing mode 110, a memory 120, a processor 130, and a display unit 140.

The memory 120, the processor 130, and the display unit 140 are electrically connected, directly or indirectly, between one another to achieve transmission or interaction of data. For example, these elements may be electrically connected between one another via one or more communication buses or signal lines. The device for converting video playing mode 110 comprises at least one software function module that can be stored in the memory 120 or embedded in the operating system (OS) of the mobile terminal 100 in the form of software or firmware. The processor 130 is used to execute an executable module stored in the memory 120, such as the software function module, a computer program, etc., comprised in the device for converting video playing mode 110.

Here, the memory 120 may include, but is not limited to, Random Access Memory (RAM), Read Only Memory (ROM), Programmable Read-Only Memory (PROM), Erasable Programmable Read-Only Memory (EPROM), Electric Erasable Programmable Read-Only Memory (EEPROM), etc. Here, the memory 120 is used to store a program, and upon receiving an execution instruction, the processor 130 executes the program.

The processor 130 may be an Integrated Circuit chip and has signal processing capabilities. The above-described processor may be a general processor, comprising a Central Processing Unit (CPU), a Network Processor (NP), etc.; or may be a Digital Signal Processor (DSP), an Application Specific Integrated Circuit (ASIC), a Field Programmable Gate Array (FPGA), or other programmable logic devices, discrete gate or transistor logic devices, discrete hardware components, etc., which can achieve or implement all methods, steps, and logic block diagrams disclosed in the embodiments of the present specification. The general processor may be a micro-processor, or the processor may also be any conventional processor.

The display unit 140 provides an interactive interface (e.g., a video playing window) between the mobile terminal 100 and a user, or is used for displaying image data. In the present embodiment, the display unit 140 may be a liquid crystal display or a touchscreen display. If it is a touchscreen display, the display unit 140 may be a capacitive touchscreen or resistive touchscreen that supports single-touch and multi-touch operations. Supporting single-touch and multi-touch operations means that the touchscreen display can sense touch operations generated at one or more locations of the touchscreen display, and pass the sensed touch operations to the processor 130 for computation and processing.

Figure 2:
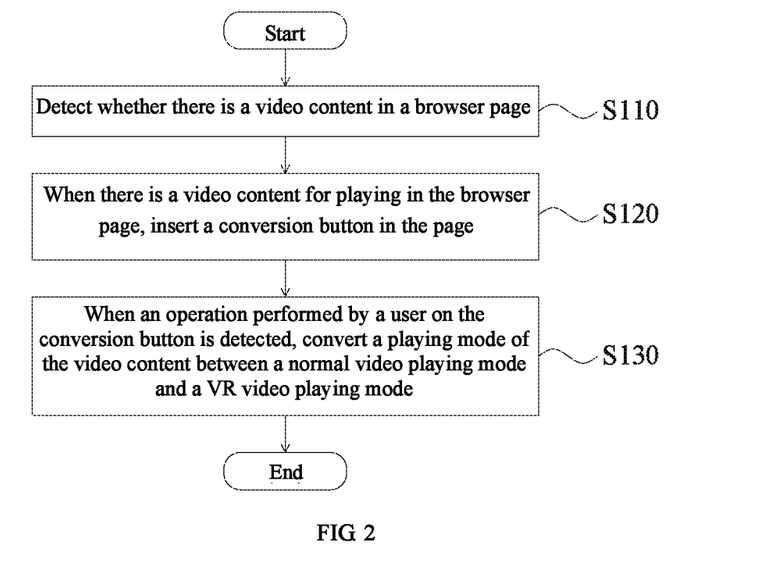
FIG. 2 is a first flow chart of the method for converting video playing mode according to some embodiments of the present specification.
Figure 3:
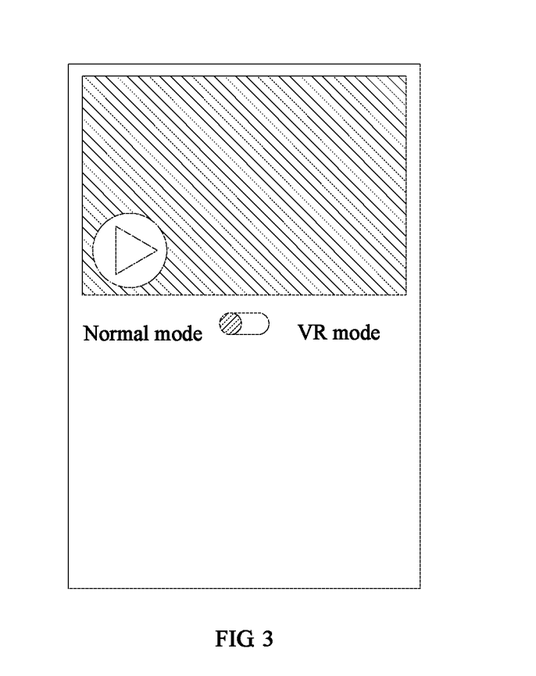
FIG. 3 is a first schematic diagram of the conversion button according to some embodiments of the present specification.
Figure 4:
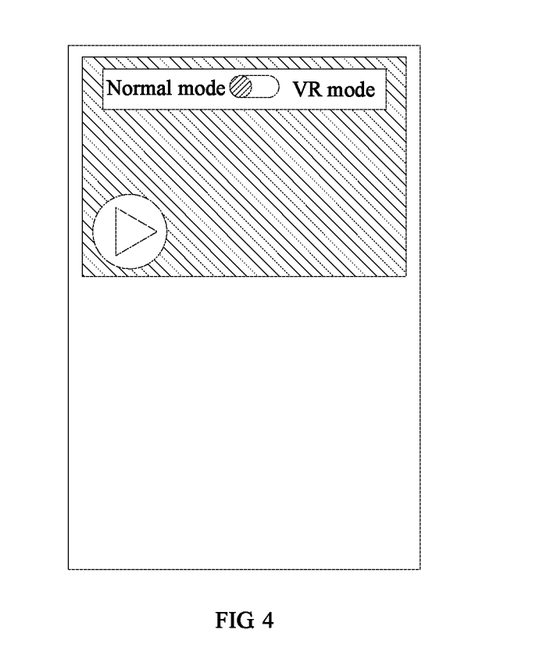
FIG. 4 is a second schematic diagram of the conversion button according to some embodiments of the present specification.

FIG. 2 is a flow chart of the method for converting video playing mode applicable on the mobile terminal 100 in FIG. 1. The method comprises the following steps.

Step S110, detecting whether there is a video content in a browser page.

In general, a video content in a browser page is represented by a video label (e.g., the <video> label) in the HTML file of the page. In the present embodiment, the mobile terminal 100 may determine whether there is a video content in a browser page by detecting whether, in the HTML file of the browser page, there is a first video label associated with the video content.

Step S120, when there is a video content for playing in the browser page, inserting a conversion button in the page.

After the mobile terminal 100 detects that there is a first video label in the HTML file, a conversion button is inserted in the page, and the conversion button may be used to switch from a normal video playing mode to a VR video playing mode.

In some embodiments, the mobile terminal 100 inserts a conversion button display label in the HTML file and renders a conversion button corresponding to the conversion button display label in the page.

In some other embodiments, the mobile terminal 100 executes a conversion button display script in the JavaScript format, and the mobile terminal 100 displays a floating conversion button in the page through the conversion button script.

Step S130, when an operation performed by a user on the conversion button is detected, converting playing mode of the video content between a normal video playing mode and a VR video playing mode.

In some embodiments, the VR video playing mode is for viewing with VR glasses. In the VR video playing mode, the mobile terminal 100 displays two videos for the left eye and the right eye to view, respectively, in cooperation with the VR glasses, to achieve a visual stereoscopic effect (i.e., a 3D visual effect).

Figure 5:
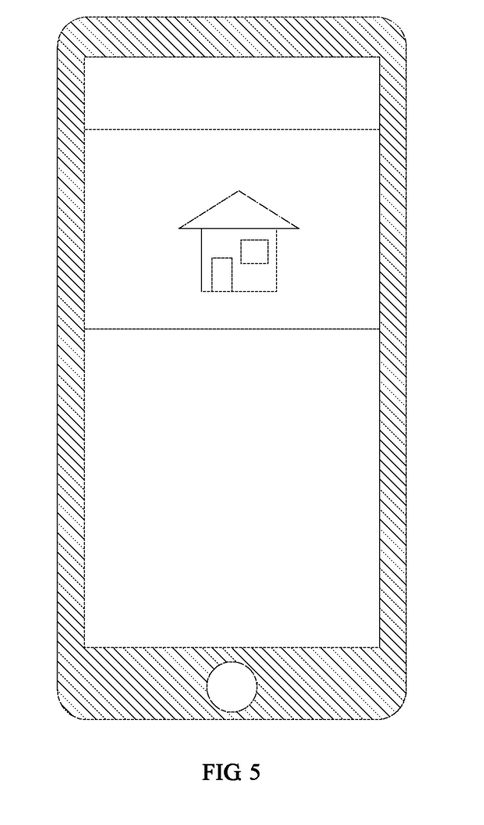
FIG. 5 is a schematic diagram of a normal video playing mode according to some embodiments of the present specification.
Figure 6:
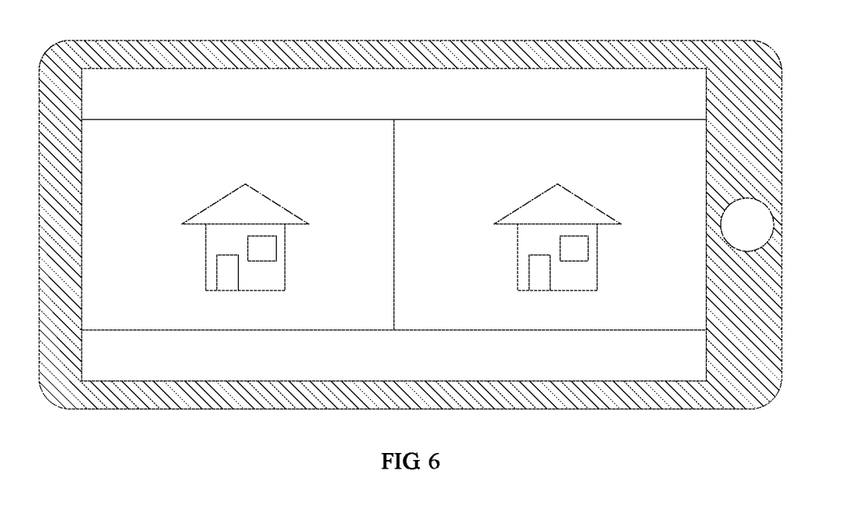
FIG. 6 is a schematic diagram of a VR video playing mode according to some embodiments of the present specification.

In some embodiments, the mobile terminal 100 adjusts a play window in the normal video playing mode shown in FIG. 5 to two horizontally side-by-side play windows as shown in FIG. 6, thereby converting the playing mode of the video content from a normal video playing mode to a VR video playing mode, so that the video content is suitable for viewing with VR glasses.

Figure 7:
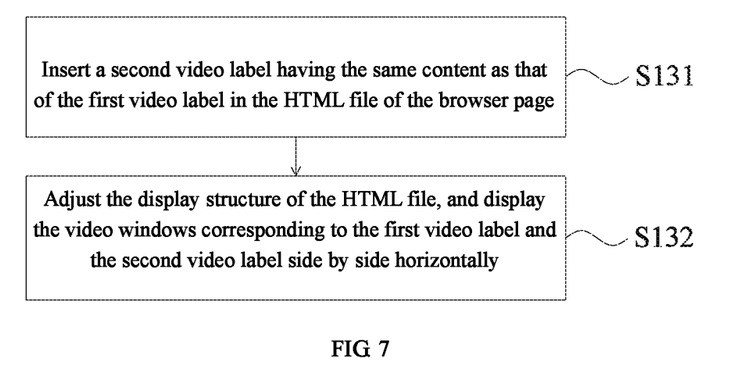
FIG. 7 is a flow chart of sub-steps in Step S130 in FIG. 2.

In some embodiments, Step S130 may further comprise a sub-step S131 and a sub-step S132. Sub-step S131 includes inserting a second video label having the same content as that of the first video label in the HTML file of the browser page.

In one embodiment, the mobile terminal 100 duplicates, through the browser, the first video label as the second video label, and inserts the second video label in the HTML file.

In another embodiment, the mobile terminal 100 sends, to a third-party server, a request for obtaining a video conversion script in the JavaScript format, and executing the received video conversion script to insert a second video label that is the same as the first video label in the HTML file.

Sub-step S132 includes adjusting the display structure of the HTML file, and displaying the video windows corresponding to the first video label and the second video label side by side horizontally.

After the mobile terminal 100 inserts the second video label in the HTML file, the mobile terminal 100 adjusts the CSS structure of the HTML file through the browser itself or the JavaScript, so that the video windows corresponding to the first video label and the second video label can be displayed side by side horizontally. In the present embodiment, the mobile terminal 100 further adjusts the screen display mode to a horizontal screen display, and displays the video windows corresponding to the first video label and the second video label side by side horizontally.

Figure 8:
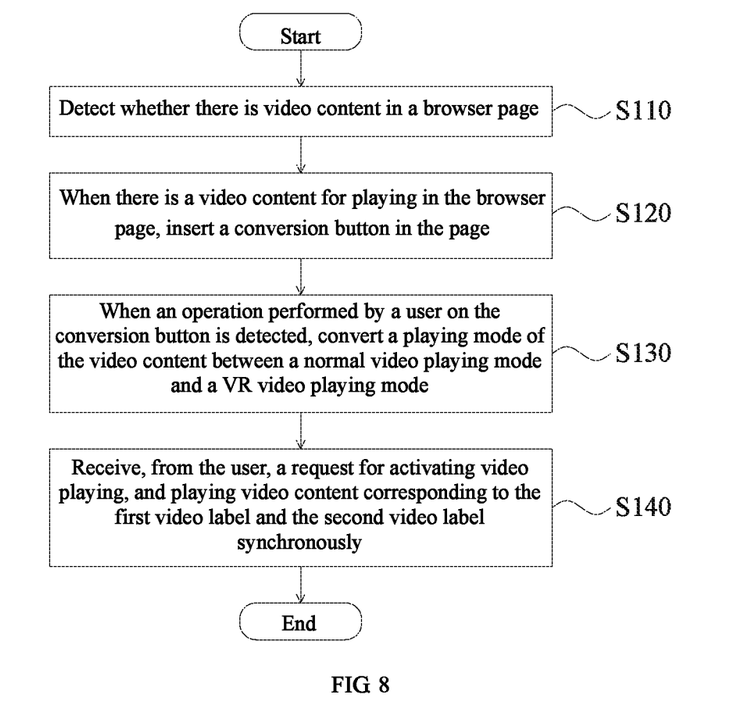
FIG. 8 is a second flow chart of the method for converting video playing mode according to some embodiments of the present specification.

The method may further comprise Step S140.

Step S140 includes receiving, from the user, a request for playing the video, and playing the video content corresponding to the first video label and the second video label synchronously.

When the mobile terminal 100 receives, from the user, a request for playing the video, the mobile terminal 100 plays the video content on the video windows corresponding to the first video label and the second video label synchronously. This way, through the VR glasses, videos on the two video windows are shown to the left eye and the right eye of the user for viewing, respectively, thereby achieving the 3D visual effect.

Figure 9:
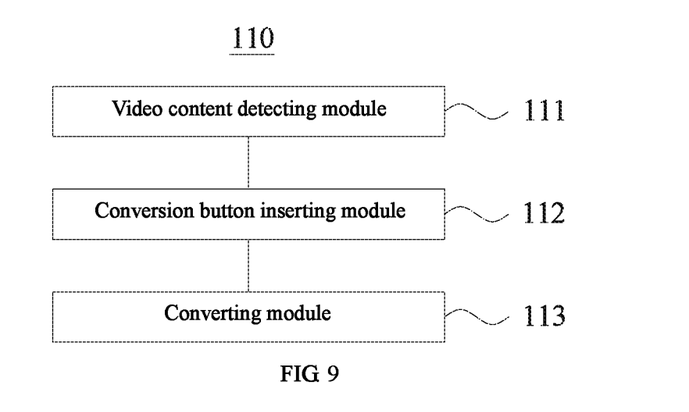
FIG. 9 is a first schematic diagram of the device for converting video playing mode according to some embodiments of the present specification.

FIG. 9 is a block diagram of function modules of the device for converting video playing mode 110 according to some embodiments of the present specification. The device for converting video playing mode 110 comprises the video content detecting module 111, the conversion button inserting module 112, and the conversion button inserting module 112.

The video content detecting module 111 is configured to detect whether there is a video content in a browser page. In the present embodiment, the video content detecting module 111 may be configured to execute the step S110 shown in FIG. 2. For a detailed description of the video content detecting module 111, the description of the step S110 may be referred to.

In one example, the manner in which the video content detecting module 111 detects whether there is video content in a page comprises: detecting a label in the HTML file of the browser page, and determining whether there is a first video label associated with the video content.

The conversion button inserting module 112 is configured to insert, when there is a video content for playing in the browser page, a conversion button in the page. In the present embodiment, the conversion button inserting module 112 may be configured to execute the step S120 shown in FIG. 2. For a detailed description of the conversion button inserting module 112, the description of the step S120 may be referred to.

In one example, the manner in which the conversion button inserting module 112 inserts a conversion button comprises: inserting a conversion button display label in the HTML file, and rendering a conversion button corresponding to the conversion button display label in the page; or executing a conversion button display script to display a floating conversion button in the page.

The converting module 113 is configured to convert, when an operation performed by the user on the conversion button is detected, a playing mode of the video content between a normal video playing mode and a VR video playing mode. In the present embodiment, the converting module 113 may be configured to execute the step S130 shown in FIG. 2. For a detailed description of the converting module 113, the description of the step S130 may be referred to.

In one example, the VR video playing mode is for viewing with VR glasses. The manner in which the converting module 113 converts a playing mode of the video content from the normal video playing mode to the VR video playing mode comprises: adjusting a playing window in the normal video playing mode to two horizontally side-by-side playing windows, thereby converting the playing mode of the video content from the normal video playing mode to the VR video playing mode, so that the video content can be rendered suitable for viewing with VR glasses.

Figure 10:
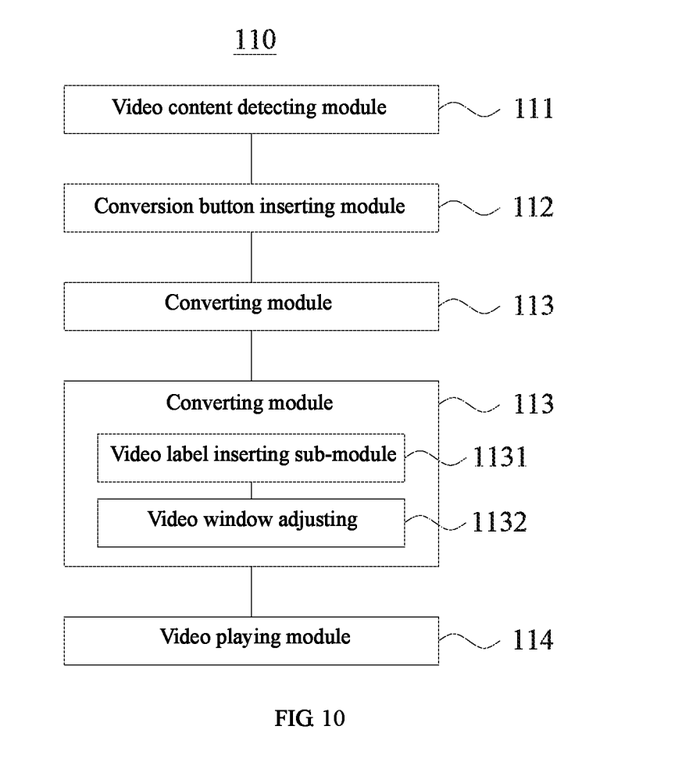
FIG. 10 is a second schematic diagram of the device for converting video playing mode according to some embodiments of the present specification.

Furthermore, in the present embodiment, the manner in which the converting module 113 adjusts a playing window in the normal video playing mode to two horizontally side-by-side playing windows comprises: sending, to a third-party server, a request for obtaining a video conversion script, and executing the received video conversion script to adjust a playing window in the normal video playing mode to the two horizontally side-by-side playing windows For example, in FIG. 10, the converting module 113 comprises a video label inserting sub-module 1131 and a video window adjusting sub-module 1132.

The video label inserting sub-module 1131 is configured to insert a second video label having the same content as that of the first video label in the HTML file of the browser page. In the present embodiment, the video label inserting sub-module 1131 may be configured to execute the step S131 shown in FIG. 7. For a detailed description of the video label inserting sub-module 1131, the description of the step S131 may be referred to.

The video window adjusting sub-module 1132 is configured to adjust the display structure of the HTML file and display the video windows corresponding to the first video label and the second video label side by side horizontally. In the present embodiment, the video window adjusting sub-module 1132 may be configured to execute the step S132 shown in FIG. 7. For a detailed description of the video window adjusting sub-module 1132, the description of the step S132 may be referred to.

In one example, the video window adjusting sub-module 1132 displaying the video windows corresponding to the first video label and the second video label side by side horizontally comprises: adjusting the screen display mode to a horizontal screen display, and displaying the video windows corresponding to the first video label and the second video label side by side horizontally.

The device may further comprise a video playing module 114.

The video playing module 114 is configured to receive, from the user, a request for playing the video, and play the video content corresponding to the first video label and the second video label synchronously. In the present embodiment, the video playing module 114 may be configured to execute the step S140 shown in FIG. 8. For a detailed description of the video playing module 114, the description of the step S140 may be referred to.

In summary, the present specification provides a method, device, and a mobile terminal 100 for converting video playing mode. By detecting video content in a browser page, a conversion button is inserted in the page when there is video content in the page. Moreover, when an operation performed by a user on the conversion button is detected, a playing window in the normal video playing mode is adjusted to two horizontally side-by-side playing windows for playing the video content synchronously, thereby converting a normal video playing mode to a VR video playing mode on the browser page.

The mobile terminal is used as an example for description; however, it can also be extended to any terminal apparatus comprising a memory, a processor, and the above-described device for converting video playing mode 110. In addition, as described above, the device for converting video playing mode 110 may comprise a software function module and a computer program, namely, the device for converting video playing mode may be embodied in a software program. Therefore, the embodiments of the present specification further provide a terminal apparatus, and the terminal apparatus comprises: a memory; a processor; and a software program for converting video playing mode, the software program being stored in the memory and executable on the processor, wherein the following steps are implemented when the processor executes the software program: detecting whether there is video content in a browser page; when there is a video content for playing in the browser page, inserting a conversion button in the page; and when an operation performed by a user on the conversion button is detected, converting playing mode of the video content between a normal video playing mode and a VR video playing mode.

In one embodiment, the VR video playing mode is for viewing with VR glasses; and the step of converting playing mode of the video content between a normal video playing mode and a VR video playing mode comprises: adjusting a playing window in the normal video playing mode to two horizontally side-by-side playing windows, thereby converting the playing mode of the video content from a normal video playing mode to a VR video playing mode.

In another embodiment, the step of detecting whether there is video content in a page comprises: detecting a label in the HTML file of the browser page, and determining whether there is a first video label associated with the video content.

In yet another embodiment, inserting a conversion button in the page comprises: inserting a conversion button display label in the HTML file, and rendering a conversion button corresponding to the conversion button display label in the page; or executing a conversion button display script to display a floating conversion button in the page.

In still another embodiment, adjusting a playing window in the normal video playing mode to two horizontally side-by-side playing windows comprises: inserting a second video label having the same content as that of the first video label in the HTML file of the browser page; and adjusting the display structure of the HTML file and displaying the video windows corresponding to the first video label and the second video label side by side horizontally.

In some embodiments, displaying the video windows corresponding to the first video label and the second video label side by side horizontally comprises: adjusting the screen display mode to a horizontal screen display, and displaying the video windows corresponding to the first video label and the second video label side by side horizontally.

In some other embodiments, the following step may be further executed: receiving, from the user, a request for playing the video, and playing the video content corresponding to the first video label and the second video label synchronously.

In still other embodiments, adjusting a playing window in the normal video playing mode to two playing windows side by side horizontally comprises: sending, to a third-party server, a request for obtaining a video conversion script, and executing the received video conversion script to adjust a playing window in the normal video playing mode to the two horizontally side-by-side playing windows.

Since the steps executed when the processor executes the software program are the same as the corresponding steps of the above-described method for converting video playing mode, all of the above detailed description of the method for converting video playing mode may be used here, which, therefore, will not be repeated here.

The present specification may further provide a non-transitory computer-readable storage medium for converting video playing mode. The non-transitory computer-readable storage medium may store instructions executable by one or more processors, causing the one or more processors to perform operations. The operations may include detecting a video content for playing in a browser page; inserting a conversion button in the browser page for converting the playing mode of the video content; and in response to an operation performed by a user on the conversion button, converting the playing mode of the video content between a normal video playing mode and a VR (virtual reality) video playing mode.

In one embodiment, the VR video playing mode is for viewing with VR glasses; and the operation of converting playing mode of the video content between a normal video playing mode and a VR video playing mode may include: changing a playing window in the normal video playing mode to two horizontally side-by-side playing windows for playing the video content synchronously.

In another embodiment, the operation of detecting the video content may include: detecting a first video label in a HTML file of the browser page, the first video label associated with the video content.

In yet another embodiment, inserting a conversion button in the page may include: inserting a conversion button display label in the HTML file, and rendering the conversion button corresponding to the conversion button display label in the browser page; or executing a conversion button display script to display a floating conversion button in the browser page.

In still another embodiment, changing a playing window in the normal video playing mode to two horizontally side-by-side playing windows may include: inserting a second video label having the same content as that of the first video label in the HTML file of the browser page; and adjusting a display structure of the HTML file to display the two video windows side by side horizontally, the two video windows corresponding to the first video label and the second video label respectively.

In some embodiments, the following operation may be further performed: playing the video content corresponding to the first video label and the second video label synchronously.

In some other embodiments, changing a playing window in the normal video playing mode to two horizontally side-by-side playing windows may further include: sending, to a third-party server, a request for obtaining a video conversion script; and executing the received video conversion script to change the playing window in the normal video playing mode to the two horizontally side-by-side playing windows.

In the embodiments of the present specification, the disclosed device, non-transitory computer-readable storage medium and method may also be embodied in other manners. The above-described device embodiments are only exemplary. For example, the flow charts and block diagrams in the accompany drawings illustrate systems, architecture, functions, and operations that may be achieved according to the device, method, and computer program product of a plurality of embodiments of the present specification. Thus, each block in the flow charts or block diagrams may represent a part of a module, a program segment or codes; the part of a module, a program segment or codes comprises one or more executable instructions for achieving prescribed logic functions. In some alternative implementation manners, functions shown in the blocks may execute in an order different from what is shown in the accompany drawings. For example, two consecutive blocks may be executed substantially in parallel, or sometimes executed in a reverse order, which is dependent on the involved functions. Each block in the block diagrams and/or flow charts and a combination of blocks in the block diagrams and/or flow charts may be implemented by a special-purpose hardware-based system that executes prescribed functions or actions, or implemented by a combination of special-purpose hardware and computer instructions.

In addition, function modules in the embodiments of the present specification may be integrated to form an independent part, each module may exist separately, or two or more modules may be integrated to form an independent part.

If the functions are achieved in the form of software function modules and are sold or used as independent products, the products may be stored in a computer readable storage medium. Therefore, the present specification further provides a storage device, which stores a plurality of instructions, and the instructions are applicable for being loaded to a processor and implementing the method for converting video playing mode described in the embodiments above or a method for converting video playing mode described in a combination with preferred embodiments. On the basis of this understanding, the technical solution of the present specification substantially, or a part of the technical solution of the present specification that contributes to current technologies, or a part of the technical solution can be embodied in the form of a software product. The computer software product is stored in a storage medium, comprising several instructions to enable a computer device (which may be a personal computer, a server, or a network device) to execute all or some steps of the methods of the embodiments of the present specification. The above storage medium comprises various media capable of storing program codes, such as a USB flash drive, a mobile hard drive, a Read-Only Memory (ROM), a Random-Access Memory (RAM), a magnetic disk, or an optical disk.

Relational terms such as first and second in this specification are only used to differentiate one entity or operation from another entity or operation, and do not necessarily require or imply any of such actual relations or orders between these entities or operations. Moreover, the terms of "including," "comprising," or any other variants of the terms are intended to encompass a non-exclusive inclusion, causing a process, method, commodity, or device comprising a series of elements to not only comprise these elements, but also comprise other elements that are not clearly listed, or further comprise elements that are inherent to the process, method, commodity, or device. When there is no further restriction, elements defined by the statement "comprising one . . . " do not exclude that a process, method, commodity, or device comprising the above elements further comprises additional identical elements.

The above-described is only preferred embodiments of the present specification, which are not used to limit the present specification. To one of ordinary skill in the art, the present specification may have various modifications and changes. Any modification, equivalent substitution, or improvement made within the spirit and principle of the present specification shall be encompassed by the claims of the present specification. Similar numerals and letters represent similar items in the accompanying drawings below.

The above describes exemplary embodiments of the present specification; however, the protection scope of the present specification is not limited by the exemplary embodiments. Any modification or substitution that can be easily conceived of by one of ordinary skill in the art within the technical scope disclosed by the present specification shall be encompassed by the protection scope of the present specification. Therefore, the protection scope of the present specification shall be subject to the claims.

What is claimed is:

1. A method for converting video playing mode, comprising:
   detecting a first video label in a HTML file of a browser page, the first video label being associated with a video content for playing in the browser page;
   inserting a conversion button in the browser page for converting a video playing mode of the video content; and
   in response to an operation performed by a user on the conversion button, converting the video playing mode of the video content between a normal video playing mode and a VR (virtual reality) video playing mode by:
      inserting a second video label having the same content as that of the first video label in the HTML file of the browser page; and
      adjusting a display structure of the HTML file to display two video windows side by side horizontally for playing the video content synchronously, the two video windows corresponding to the first video label and the second video label respectively.

2. The method according to claim 1, wherein the VR video playing mode is for viewing with VR glasses.

3. The method according to claim 1, wherein inserting the conversion button in the browser page comprises:
   inserting a conversion button display label in the HTML file; and
   rendering the conversion button corresponding to the conversion button display label in the browser page.

4. The method according to claim 1, wherein inserting the conversion button in the browser page comprises: executing a conversion button display script to display a floating.

5. The method according to claim 1, further comprising:
   playing the video content corresponding to the first video label and the second video label synchronously.

6. The method according to claim 1, further comprising:
   sending, to a third-party server, a request for obtaining a video conversion script; and
   executing the received video conversion script to change a video window in the normal video playing mode to the two horizontally side-by-side video windows.

7. A non-transitory computer-readable storage medium for converting video playing mode, storing instructions executable by one or more processors causing the one or more processors to perform operations comprising:
   detecting a first video label in a HTML file of a browser page, the first video label being associated with a video content for playing in the browser page;
   inserting a conversion button in the browser page for converting a video playing mode of the video content; and
   in response to an operation performed by a user on the conversion button, converting the video playing mode of the video content between a normal video playing mode and a VR (virtual reality) video playing mode by:
      inserting a second video label having the same content as that of the first video label in the HTML file of the browser page; and
      adjusting a display structure of the HTML file to display two video windows side by side horizontally for playing the video content synchronously, the two video windows corresponding to the first video label and the second video label respectively.

8. The non-transitory computer-readable storage medium according to claim 7, wherein the VR video playing mode is for viewing with VR glasses.

9. The non-transitory computer-readable storage medium according to claim 7, wherein inserting the conversion button in the browser page comprises:
   inserting a conversion button display label in the HTML file; and
   rendering the conversion button corresponding to the conversion button display label in the browser page.

10. The non-transitory computer-readable storage medium according to claim 7, wherein inserting the conversion button in the browser page comprises: executing a conversion button display script to display a floating conversion button in the browser page.

11. The non-transitory computer-readable storage medium according to claim 7, wherein the operations further comprise:
   sending, to a third-party server, a request for obtaining a video conversion script; and
   executing the received video conversion script to change a video window in the normal video playing mode to the two horizontally side-by-side video windows.

12. A device for converting video playing mode, comprising one or more processors and one or more non-transitory computer-readable memories coupled to the one or more processors and configured with instructions executable by the one or more processors to cause the system to perform operations comprising:
   detecting a first video label in a HTML file of a browser page, the first video label being associated with a video content for playing in the browser page;
   inserting a conversion button in the browser page for converting a video playing mode of the video content; and
   in response to an operation performed by a user on the conversion button, converting the video playing mode of the video content between a normal video playing mode and a VR (virtual reality) video playing mode by:
      inserting a second video label having the same content as that of the first video label in the HTML file of the browser page; and
      adjusting a display structure of the HTML file to display two video windows side by side horizontally for playing the video content synchronously, the two video windows corresponding to the first video label and the second video label respectively.

13. The device according to claim 12, wherein the VR video playing mode is for viewing with VR glasses.

14. The device according to claim 12, wherein the operations further comprise:
   sending, to a third-party server, a request for obtaining a video conversion script; and executing the received video conversion script to change a video window in the normal video playing mode to the two horizontally side-by-side video windows.

\* \* \* \* \*